Patented Apr. 1, 1952

2,590,911

UNITED STATES PATENT OFFICE 2,590,911

PARTIAL ESTERS

Harold Wittcoff, Minneapolis, Minn., assignor to General Mills, Inc., a corporation of Delaware No Drawing. Application October 21, 1948, Serial No. 55,839

11 Claims. (Cl. 260—333)

The present invention relates to the higher fatty acid partial esters of the ketone-formaldehyde condensation products described in my copending application, Serial No. 599,948, filed June 16, 1945, now Patent No. 2,480,347, entitled Esters, of which the present application is a continuation-in-part. The polyhydroxy condensation products which are contemplated by the present invention are those which have at least four hydroxyl groups and which result from the condensation of formaldehyde with a ketone having at least four active hydrogen atoms adjacent the carbonyl group. The invention contemplates the esterification of these polyhydroxy condensation products with higher fatty acids, either saturated or unsaturated, the fatty acids containing from seven to twenty-two or more carbon atoms. The invention contemplates the partial esterification of these polyhydroxy compounds with these higher fatty acids, the acids being used either singly or in admixture. It is intended to include within the scope of this invention all esters of such polyhydroxy condensation products which have at least one hydroxyl group esterified with such a higher fatty acid and which also possess at least one unesterified hydroxyl group.

The products of the present invention may vary quite widely depending upon the particular ketone employed for the condensation with formaldehyde, and also by the extent of esterification of this condensation product and the nature of the fatty acid employed for the esterification. In general, the products possess surface-active properties and are useful as emulsifying waxes, plasticizers, emulsifying agents, and as intermediates which on sulfonation, phosphorylation, or reaction with epoxides such as ethylene oxide, yield wetting agents, detergents, and other surface-active agents, textile assistants and lubricants, emulsifying agents, and a variety of related substances. Furthermore, these partial esters may also be reacted with dibasic acids to yield alkyds, as will be seen more fully hereinafter.

It is, therefore, a primary object of the present invention to provide higher fatty acid partial esters of polyhydroxy condensation products of formaldehyde and a ketone, the condensation products containing at least four hydroxyl groups and being derived from a ketone having at least four active hydrogen atoms adjacent the carbonyl group.

This and other objects of the invention will be more fully apparent from the following description of the invention with particular reference to the examples which are to be considered as illustrative only and not as limiting the invention.

In general the invention involves the preparation of esters of higher fatty acids of more than seven carbon atoms, of polyhydroxy condensation products of formaldehyde with ketone. The polyhydroxy condensation products employed in the present invention may be derived from any aliphatic or alicyclic ketone which has at least four active hydrogens adjacent the carbonyl group. Typical ketones of this type include cyclohexanone, cyclopentanone, acetone, methyl ethyl ketone, diethyl ketone, diacetyl, acetonylacetone, diacetone alcohol, levulinic acid, and the like. In the preparation of the polyhydroxy condensation products it is usually preferred to employ at least one mole of formaldehyde per mole of active hydrogen in the ketone. In those instances in which the ketone is capable of being reduced to a secondary alcohol group an additional mole of formaldehyde should be employed for this purpose. In addition, it is usually preferred to employ a slight excess of formaldehyde over that theoretically required.

The preparation of some of the condensation products of ketones referred to herein have been recorded in the literature. Apel et al., Ann., 289, 46 (1896), and Apel and Tollens, Ber., 27, 1087 (1894). Improved methods of preparing these condensation products will be found in the examples of the present application and in the copending application of the present inventor, Serial No. 599,947, filed June 16, 1945, entitled Condensation of Ketones with Formaldehyde, now Patent No. 2,462,031 granted February 15, 1949. The condensation reaction results in a mixture of products which may be of varying degrees of hydroxylation and in some cases may be in the form of a syrupy liquid. It will be apparent that this mixture of condensation products may be used in that condition for esterification if it is not desired to produce the ester as a pure compound.

If the syrup is not readily crystallizable, and if a pure crystalline condensation product is desired, it may be obtained in some instances by forming an acetal or ester or other derivative which may subsequently be hydrolyzed to the free hydroxy compound. The formation of an acetal often takes place readily when the crude syrup is stirred with acetone. Usually there is sufficient acid present as a result of the method of preparation to catalyze acetal formation. If necessary, a small amount of acid catalyst, such as sulfuric acid, may be added. As an alternative, an acetal derivative may be obtained by heating the syrup in aqueous methanol with an aldehyde such as benzaldehyde and a small amount of mineral acid for a suitable period of time. The acetal may be isolated from the solution by filtration after which it may be purified by crystallization from a suitable solvent such as alcohol. The isolated acetal derivative may be converted to the hydroxy compound by treatment with a strong acid, such as hydrochloric acid. The volatile ketone or aldehyde may then be distilled off, leaving the pure hydroxy compound as a light-colored oil which crystallizes readily on cooling. Where the aldehyde liberated is as high boiling as benzaldehyde, the application of vacuum or the use of steam distillation is desirable.

The acids employed for the partial esterification may be selected from a wide group. Thus the aliphatic saturated acids may be used such as capric, lauric, myristic, palmitic, stearic, arachidic, behenic, and the like. Unsaturated aliphatic acids with straight or branched chain structure containing single or multiple unsaturation are of great importance in the present invention. As representative but not exclusive examples may be mentioned myristoleic, palmitoleic, oleic, isooleic, linoleic, linolenic, arachidonic, chalmoogric, licanic, eleostearic, elaidic acids, and the like. Mixed fatty acids such as are found in natural edible, semi-drying or drying oils are also of importance. As representative sources of these acids may be mentioned corn, cottonseed, soybean, linseed, perilla, tung, oiticica, sardine, menhaden, sunflower, safflower, olive, and other oils.

These acids may be used to esterify one or more of the hydroxyl groups of the hydroxylated compositions, the only requisite set forth in this invention being that at least one hydroxyl group remain unesterified. The acids may be used singly or in combination with the result that a great variety of compositions are made available by the present invention.

The esterification with the higher fatty acid may be accomplished in any of a large number of ways. The polyhydroxy compound may be used in the form of the crude syrup or it may be in the form of the isolated pure polyhydroxy compound.

The preparation of the partial esters may be accomplished by various procedures some of which are exemplified in the examples. In the first and most common procedure the polyhydric alcohol is reacted directly with the number of moles of acid stoichiometrically required to esterify the desired number of hydroxyl groups. In this case any of the esterification processes well known to the art may be employed. Thus the reactants may be heated at temperatures varying from 150° C. to 275° C. for lengths of time varying from one to eight or more hours. The water of esterification may be removed simply by distillation, by bubbling an inert gas through the mixture or by the use of an azeotropic solvent. The latter method is particularly advantageous and solvents such as toluene, xylene, benzene, benzine, various aliphatic hydrocarbon fractions and various naphthenes as well as other high boiling partially water-insoluble materials may be used. In any case, stirring is of importance throughout the reaction.

Catalysts may be used to hasten the completion of the reaction and these include stearates, naphthenates, abietates, or other fat soluble salts of cations such as uranyl, calcium, cadmium, cerium, strontium, zinc, lead, and the like. Catalysts such as litharge, or the oxides of titanium, beryllium, thorium, and the like, may be valuable. Acids such as sulfuric, boric and phosphoric are also catalytic in nature as are salts such as sodium phosphate, sodium bisulfate, sodium bicarbonate, and the like.

The application of vacuum throughout the entire reaction or near the end is also advantageous, especially as a means for removing readily the volatile products of the reaction.

Other means of obtaining the partial esters include interaction of the polyhydric material with acid chlorides, usually in the presence of basic substances, such as pyridine or caustic. Still another method involves reacting the polyhydric alcohol with metallic sodium or the like to produce an alkoxide in which one or more of the hydroxyl groups has been converted to an OM group where M is the metal used. This alkoxide may then be reacted with a free acid or with an acid chloride. Similarly, the hydroxyl groups may be replaced by halogen atoms and these compounds are then reacted with alkali metal salts of the acids.

Still another procedure involves reacting a portion of the hydroxyl groups with aldehydes or ketones to form acetals. The remaining hydroxyl groups are esterified, after which the acetal groups are removed. Similarly some of the hydroxyl groups may be converted to trityl ethers and the trityl groups removed after the free hydroxyl groups have been esterified.

Of extreme importance in the preparation of partial esters, especially when they are to be converted to modified alkyd type resins, is the procedure of transesterification. Here the polyhydric alcohol is reacted usually with a glyceride or natural oil. The temperature of the reaction may vary from 150° to 300° C. and catalysts are usually employed such as the oil soluble salts of calcium, strontium, barium, zinc, lead, lithium, sodium and the like. Other satisfactory catalysts include sulfonic acids, sodium methylate and in fact, a great variety of basic and acidic substances.

As has been pointed out above, the products of the present invention are useful for a variety of purposes, among which may be mentioned plasticizers, emulsifying waxes, emulsifying agents, and intermediates. As plasticizers and blending agents, the compositions are compatible with a wide variety of resins, rubber substitutes, and cellulose derivatives which they serve to plasticize, soften, elasticize, lubricate, and otherwise modify. The resulting compositions may be molded under pressure, kneaded or milled on differential rolls or mixers, dissolved in solvents to form coating compositions, extruded to form ribbons, fibers or other structural shapes, emulsified or otherwise fabricated into useful compositions.

As waxes, compositions are obtained which, due to the presence of free hydroxyl groups which are polar in nature, emulsify readily to yield wax emulsions useful for polishing and the like. As aids in the emulsification process ammonia, or amines, or amine or ammonium soaps may be used as well as small quantities of sulfonated hydrocarbons. These emulsified wax compositions find application as shoe, furniture and other polishing compositions, as waterproofing for paper, cardboard, cloth, etc., as solvent retainers in varnish removers, in dye compositions for carbon paper and typewriter ribbons, as lubricants for molds to aid in the release of the molded compositions, as finishes and protective agents for the surfaces of metal or plastic objects, and as components of many other technologically useful substances. These emulsifying waxes result ordinarily when long chain saturated acids are used since these lead to solid compositions.

When the fatty acids employed are unsaturated or when they have short chain lengths, liquid products result which are valuable as emulsifying agents. Such emulsifying agents find application in food products such as shortenings, margarine and cake batters, in pharmaceuticals and cosmetics such as creams and lotions, in agricultural spray or insecticide emulsions, in defoaming agents, in leather treating compositions, in emulsion paints, in textile lubricants, in recipes for emulsion polymerization, in waterproofing compositions, and in many other similar applications.

As intermediates the partial esters offer a wide variety of uses for the preparation of other useful compounds. Sulfonation of the partial esters yields valuable detergents and surface active agents. Reaction of the partial esters with epoxides or equivalent compounds to yield oxygen-containing chains also provides detergents and surface active substances. Replacement of the hydroxyl groups of a partial ester with chlorine atoms provides oil soluble insecticides.

The free hydroxyl groups may be etherified, further esterified, oxidized to ketone or aldehyde groups, mercurated, phosphorylated, borated, and in general made to undergo any of the reactions typical of hydroxyl groups.

Of great importance is the use of these partial esters in the formulation of modified alkyd resins for protective coating purposes. Here the partial esters may be made by the interaction directly of the fatty acids and the polyhydric alcohols. Also they may be prepared by alcoholizing a natural oil with the polyhydric alcohol in which case there results a mixture of partial esters of the ketone-formaldehyde condensation product and of the glycerol in the natural oil. This procedure is discussed in detail below. If the fatty acids employed are unsaturated, oxygen convertible materials result, to which strength is added by the resinous nature of the alkyd. If, on the other hand, saturated acids such as stearic acid are used, hard wax-like compositions result. If acids such as rosin acids are used, hard, high-melting resins useful for varnish formulation result.

Example 1

In an appropriate vessel was placed 288 parts of methyl ethyl ketone, 780 parts of formaldehyde as paraformaldehyde and 3000 parts of water. There was added slowly with stirring 112 parts of calcium oxide whereupon the temperature rose spontaneously to 50° C. Thereafter cooling was employed so that the temperature would not rise higher and once the initial exothermic reaction had subsided, the reaction mixture was heated and stirred at 50°–55° C. for two hours. The solution thereupon was treated with dilute sulfuric acid until it was barely acid to Congo red indicator. Oxalic acid solution was added to make the reaction mixture strongly acid to Congo red indicator and to precipitate the last traces of calcium ion. The easily filtrable precipitate of calcium sulfate and calcium oxalate was removed whereupon the aqueous solution was evaporated in vacuo. The almost water-white syrup which resulted was treated with an organic solvent such as benzene and again evaporated in vacuo, the benzene serving to remove occluded water azeotropically, to yield an almost colorless syrup whose hydroxyl content was of the order of 30%. Because of the procedure used to remove the calcium ion the product was acidic in nature. This acidity could be in large part be removed by the use of a basic ion exchange resin such as Amberlite IR-4. The syrupy product was used in the form of an aqueous solution for esterification purposes. The high hydroxyl content of the product together with certain other analytical investigations leads to the conclusion that the product is analogous to the one obtained from acetone whereupon the structure of the chief constituent may be postulated as desoxyanhydroenneaheptitol I.

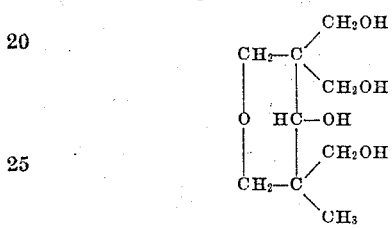

A solution of 40 parts of the syrupy condensation product described in the preceding paragraph in 300 parts of pyridine and 200 parts of chloroform was treated with 95 parts of lauroyl chloride with external cooling. After 20 hours the reaction mixture was poured over ice whereupon the product was extracted with ether. The ether solution after having been washed with dilute acid and with water was dried and desolvated to yield a product which was an oil at room temperature but which solidified readily on cooling. Analytical data (2.1% OH) indicated that the product was approximately two-thirds esterified. This material served as an emulsifying agent for vegetable oils in water, especially in the presence of a small amount of dilute alkali, and is valuable for use as an emulsifying agent in various food and pharmaceutical preparations.

Example 2

A mixture of 196 parts of cyclohexanone, 330 parts of paraformaldehyde and 1800 parts of water is cooled to 10–15° C. and 70 parts of calcium oxide are added in 10–15 minutes. The temperature during the addition is maintained at 40° C. with cooling if necessary. Thereafter the reaction mixture is stirred for one-half hour at 40° C., whereupon it is made neutral or slightly acidic (pH=5–7) with formic acid. The solution is evaporated under reduced pressure to dryness and the residue is treated with 750 parts of methanol. Upon slight heating the product dissolves and the calcium formate settles to the bottom of the vessel. The alcoholic solution of product is decanted and the alcohol is removed under reduced pressure to obtain a white crystalline solid. This material is triturated with acetone and filtered. There results 387 parts (88%) 2,2,6,6-tetramethylolcyclohexanol. Evaporation of the acetone washings yields about 40 parts of a light-colored syrup.

A mixture of 200 parts of 2,2,6,6-tetramethylolcyclohexanol and 440 parts of commercial stearic acid was stirred and heated in the presence of xylene which removed the water of reaction azeotropically. This mixture was heated at 160–190° C. for 2.5 hours, after which the xylene was removed to obtain a white wax with a hydroxyl content of 5.6%. This corresponds to a mixture of di- and tristearates.

*Example 3*

In a vessel equipped with an agitator and a reflux condenser was placed 116 parts of acetone, 480 parts of formaldehyde in the form of paraformaldehyde and 1700 parts of water. Thereafter 56 parts of calcium oxide was added with stirring. The reaction mixture thereupon was heated to 50° C. whereupon external heating was discontinued. The exothermic nature of the reaction caused the temperature to rise to 90° C. whereupon the reaction mixture was cooled to room temperature. If desired, the same effect may be attained by maintaining the reaction mixture at a temperature of 50–55° C. for one to three hours. The solution thereupon was treated with dilute sulfuric acid until it was barely acid to Congo red indicator. Oxalic acid solution was added to make the reaction mixture strongly acid to Congo red indicator and to precipitate the last traces of calcium ion. The easily filtrable precipitate of calcium sulfate and calcium oxalate was removed whereupon the aqueous solution was evaporated in vacuo. The almost water-white syrup which resulted was treated with an organic solvent such as benzene and again evaporated in vacuo, the benzene serving to remove occluded water azeotropically. The syrup which resulted had a hydroxyl content of 28–30% and contained a substantial amount of an anhydroenneaheptitol which may be more accurately described as tetrahydro-3,3,5,5-tetrakis-(hydroxymethyl)-4-pyranol.

A mixture of 100 parts of the syrupy condensation product described immediately above, as an 80% solution, together with 290 parts of stearic acid and 10 parts of calcium stearate was heated at 210° C. under nitrogen for 2.5 hours. An ethanolic solution of the product was treated with charcoal, filtered and allowed to precipitate to yield a white solid melting at 57° C. The hydroxyl content of the product (3.2%) indicated two free hydroxyl groups. The acid content of the product was negligible. The product readily emulsified oleaginous material such as vegetable oils and water when heated and shaken especially in the presence of a small amount of dilute alkali. The products of this nature are valuable as emulsifying agents in various food and pharmaceutical preparations.

*Example 4*

A mixture of 144 parts of technical caprylic acid and 200 parts of 2,2,6,6-tetramethylolcyclohexanol was esterified azeotropically in the presence of 1.8 parts of lead stearate. Xylene was used as the azeotropic solvent. The reaction was carried out at 150° C. for a period of 7 hours, after which the xylene was removed in vacuo, to obtain a light colored, viscous liquid which was partially soluble in water. The product had an acid number of 0.2 and consisted primarily of the monocaprylic acid ester of 2,2,6,6-tetramethylolcyclohexanol.

*Example 5*

A mixture of 430.8 parts of soybean oil fatty acids, 135.5 parts of 2,2,6,6-tetramethylolcyclohexanol and 3.2 parts of lead stearate, which served as a catalyst, was esterified azeotropically using xylene to remove the water of reaction. The reaction was heated at 170–180° C. for 2 hours and at 180–190° C. for 2 hours longer. At the end of this time, the acid number was 5.8 and the hydroxyl number was 125.3. These analytical data indicate that the number of hydroxyl groups required by theory were present. In this composition 57% of the hydroxyl groups were esterified. Such a composition may be further reacted with dibasic acids such as phthalic acid, tetrahydrophthalic acid, succinic acid, maleic acid, or similar acids to form alkyd resins.

*Example 6*

An esterification was carried out similarly to the one described in Example 5 in which 161.5 parts of soybean oil fatty acids were reacted with 81 parts of 2,2,6,6-tetramethylolcyclohexanol in the presence of 3.2 parts of lead stearate. The total time of reaction was three hours at 170–180° C., at the end of which time the acid number was 9. In this composition, 36% of the hydroxyl groups were esterified.

*Example 7*

A composition similar to the one described in Example 5 was prepared in which 242.3 parts of soybean oil fatty acids were reacted with 59.8 parts of 2,2,6,6-tetramethylolcyclohexanol in the presence of 3.2 parts of lead stearate. In this case, the reaction mixture was heated at 180° C. for 3.5 hours, at the end of which time the acid number was 12. This composition was a light colored oil in which 73% of the hydroxyl groups were esterified.

*Example 8*

In this example the partial ester of 2,2,6,6-tetramethylolcyclohexanol was prepared by alcoholizing soybean oil. Thus a mixture of 265 parts of soybean oil, 27.1 parts of 2,2,6,6-tetramethylolcyclohexanol, and 3.2 parts of lead stearate were heated for ten minutes at 185–190° C. At the end of this time the alcoholized mixture was entirely soluble in methanol, indicating that the fatty acids had been distributed between the 2,2,6,6-tetramethylolcyclohexanol and the glycerol of the soybean oil. Such a mixture is likewise capable of being reacted with the dibasic acids listed in Example 5 to form alkyd resins. Instead of the lead stearate which was employed as the catalyst, other compounds such as sodium stearate, zinc stearate, calcium stearate, sodium ethoxide, or sodium hydroxide could be used. The alcoholysis in this example was carried out at 185–190° C. At 230° C. the alcoholysis proceeded even more rapidly and with catalysts such as lead stearate and sodium stearate was complete in 1–2 minutes.

*Example 9*

This example was carried out similarly to the preceding one, save that the ratio of reactants was different. Thus a mixture of 265 parts of soybean oil, 50 parts of 2,2,6,6-tetramethylolcyclohexanol and 2.65 parts of lead stearate was heated at 180–190° C. for ten minutes. At this point the mixture was homogeneous and completely soluble in methanol.

While numerous modifications of the invention have been described, other modifications are also possible without departing from the spirit of the invention.

I claim as my invention:

1. An ester comprising a polyhydroxy condensation product having at least four hydroxyl groups, said polyhydroxy condensation product resulting from the condensation of formaldehyde and a ketone having at least four replaceable hydrogen atoms adjacent the carbonyl group, in which the molal ratio of formaldehyde to ketone is not substantially less than one mole of formaldehyde per mole of active hydrogen in the ketone, said polyhydroxy condensation product having at least one free hydroxyl group and at least one hydroxyl group esterified with a higher fatty acid.

2. 2,2,6,6-tetramethylolcyclohexanol partially esterified with a higher fatty acid, and having at least one free hydroxyl group.

3. Tetrahydro - 3,3,5,5 - tetrakis - (hydroxymethyl)-4-pyranol partially esterified with a higher fatty acid, and having at least one free hydroxyl group.

4. Tetrahydro - 3,3,5 - tris - (hydroxymethyl) - 5-methyl-4-pyranol partially esterified with a higher fatty acid, and having at least one free hydroxyl group.

5. An ester according to claim 1 in which the higher fatty acid is lauric acid.

6. A compound according to claim 4 in which the higher fatty acid is lauric acid.

7. An ester according to claim 1 in which the fatty acids are the mixed fatty acids of an oil.

8. An ester according to claim 1 in which the fatty acids are the mixed fatty acids of soybean oil.

9. 2,2,6,6-tetramethylolcyclohexanol partially esterified with the mixed fatty acids of an oil, and having at least one free hydroxyl group.

10. 2,2,6,6-tetramethylolcyclohexanol partially esterified with the mixed fatty acids of soybean oil, and having at least one free hydroxyl group.

11. 2,2,6,6-tetramethylolcyclohexanol partially esterified with caprylic acid.

HAROLD WITTCOFF.

REFERENCES CITED

The following references are of record in the file of this patent:

UNITED STATES PATENTS

| Number | Name | Date |
|---|---|---|
| 2,303,370 | Kugler | Dec. 1, 1942 |
| 2,462,031 | Wittcoff | Feb. 15, 1949 |
| 2,470,964 | Wittcoff | May 24, 1949 |
| 2,480,347 | Wittcoff | Aug. 30, 1949 |
| 2,480,348 | Wittcoff | Aug. 30, 1949 |
| 2,495,305 | Wyler | Jan. 24, 1950 |

FOREIGN PATENTS

| Number | Country | Date |
|---|---|---|
| 419,604 | Great Britain | Nov. 13, 1934 |